(12) United States Patent
Mizutani et al.

(10) Patent No.: US 7,311,799 B2
(45) Date of Patent: Dec. 25, 2007

(54) HYDROFLUORIC ACID WASTEWATER TREATMENT METHOD AND DEVICE

(75) Inventors: Junji Mizutani, Osaka (JP); Mitsuo Maeda, Osaka (JP); Tamito Mukaida, Osaka (JP); Yasushi Nishimura, Osaka (JP); Yutaka Shiomi, Osaka (JP); Koji Harada, Osaka (JP); Yoshio Tanimoto, Osaka (JP); Toshiaki Muratani, Yamatokoriyama (JP)

(73) Assignees: Sasakura Engineering Co., Ltd., Osaka-Shi (JP); Sharp Kabushiki Kaisha, Osaka-Shi (JP)

( * ) Notice: Subject to any disclaimer, the term of this patent is extended or adjusted under 35 U.S.C. 154(b) by 303 days.

(21) Appl. No.: 10/722,990

(22) Filed: Nov. 26, 2003

(65) Prior Publication Data

US 2004/0104107 A1 Jun. 3, 2004

(30) Foreign Application Priority Data

Nov. 28, 2002 (JP) .............................. 2002-346465

(51) Int. Cl.
*B01D 1/00* (2006.01)
(52) U.S. Cl. .................. 159/3; 159/47.1; 210/180; 210/182; 210/195.1; 210/202; 210/205; 210/259; 210/634; 210/669; 210/749; 210/774; 210/805; 210/806; 423/488
(58) Field of Classification Search ................ 210/180, 210/182, 201, 202, 206, 259, 511, 631, 634, 210/650, 651, 663, 774, 804, 806, 915, 195.1, 210/205, 749, 805; 204/518–520, 542, 554, 204/627–631, 660–666; 159/17.1, 17.3, 159/47.1, 47.3, 3; 423/483, 484, 488; 203/28, 203/39; 422/129, 140
See application file for complete search history.

(56) References Cited

U.S. PATENT DOCUMENTS 3,787,304 A * 1/1974 Chlanda et al. ............. 204/517
4,599,156 A * 7/1986 Srinivasan et al. ......... 204/520
5,980,850 A 11/1999 Lebl
6,379,548 B1 * 4/2002 Kurokawa et al. .......... 210/631

FOREIGN PATENT DOCUMENTS

| JP | 09-271785 | 10/1997 |
| JP | 2002-331292 | 11/2002 |
| KR | 1997-27366 | 6/1997 |

* cited by examiner

*Primary Examiner*—Joseph Drodge
(74) *Attorney, Agent, or Firm*—Knobbe Martens Olson & Bear LLP

(57) ABSTRACT

The invention provides a hydrofluoric acid wastewater treatment method that achieves efficient recovery of hydrofluoric acid from hydrofluoric acid wastewater and also achieves sufficient reduction in the hydrofluoric acid concentration of the dehydrofluorinated water after treatment.

The hydrofluoric acid wastewater treatment method comprises the following steps:
a hydrofluoric acid concentration step (S1) comprising concentrating hydrofluoric acid wastewater by evaporation to produce a concentrated hydrofluoric acid water and a hydrofluoric acid-containing vapor;
a dissolution step (S2) comprising bringing the hydrofluoric acid-containing vapor obtained in the hydrofluoric acid concentration step (S1) into contact with dissolution water to dissolve the vapor;
a neutralization step (S3) comprising bringing the residual hydrofluoric acid-containing vapor left from the dissolution step (S2) into contact with an alkali to produce a neutralized liquid and a dehydrofluorinated vapor; and
a condensation step (S4) comprising condensing the dehydrofluorinated vapor obtained in the neutralization step (S3) to produce condensed water.

11 Claims, 7 Drawing Sheets

HYDROFLUORIC ACID WASTEWATER TREATMENT METHOD AND DEVICE

TECHNICAL FIELD

The present invention relates to a hydrofluoric acid wastewater treatment method and a device for treating wastewater containing hydrofluoric acid.

BACKGROUND OF THE INVENTION

Hydrofluoric acid wastewater discharged in the manufacturing process of electronic components such as semiconductors and liquid crystals is diluted and difficult to reuse. Therefore, such wastewater is conventionally treated by a method comprising neutralizing the hydrofluoric acid with slaked lime (calcium hydroxide) to form insoluble calcium fluoride, precipitating the calcium fluoride together with calcium hydroxide and separating the precipitate as a sludge from the wastewater.

However, this method has a problem in that precipitation and dehydration require an excessively large equipment space. Furthermore, the necessity of supplying an excess of calcium hydroxide results in a large amount of sludge, so that massive amounts of waste remain even after dehydration. In addition, since 15 to 20 ppm of fluorine remains in the treated water, there is still room for improvement with regard to water quality.

In this connection, Japanese Unexamined Patent Publication No. 271785/1997 describes a hydrofluoric acid wastewater treatment method comprising adding an aqueous alkaline solution such as aqueous caustic soda solution or aqueous caustic potash solution to hydrofluoric acid wastewater, followed by concentration by evaporation to produce distilled water.

DISCLOSURE OF THE INVENTION

The method disclosed in the above publication, however, has problems. Since the method comprises neutralization by adding an aqueous alkaline solution to hydrofluoric acid wastewater, the water concentrated by evaporation contains dissolved salts such as NaF, so that it is difficult to recover and reuse hydrofluoric acid from the concentrated water. Furthermore, it is difficult to control the amount of aqueous alkaline solution added so as to maintain the hydrofluoric acid concentration of the distilled water at a level suited to environmental protection.

The present invention was designed to solve the above problems. An object of the invention is to provide a hydrofluoric acid wastewater treatment method and device that enable efficient recovery of hydrofluoric acid from hydrofluoric acid wastewater and also achieve sufficient reduction in the hydrofluoric acid concentration of the dehydrofluorinated water after treatment.

The above object can be achieved by a hydrofluoric acid wastewater treatment method comprising the following steps:

a hydrofluoric acid concentration step comprising concentrating hydrofluoric acid wastewater by evaporation to produce a concentrated hydrofluoric acid water and a hydrofluoric acid-containing vapor;

a dissolution step comprising bringing the hydrofluoric acid-containing vapor obtained in the hydrofluoric acid concentration step into contact with dissolution water to dissolve the vapor;

a neutralization step comprising bringing the residual hydrofluoric acid-containing vapor left from the dissolution step into contact with an alkali to produce a neutralized liquid and a dehydrofluorinated vapor; and a condensation step comprising condensing the dehydrofluorinated vapor obtained in the neutralization step to produce condensed water.

Preferably, the hydrofluoric acid wastewater treatment method further comprises a neutralized liquid separation step comprising separating the neutralized liquid obtained in the neutralization step into hydrofluoric acid-containing water, alkali-containing water and desalted water using Ion exchange membranes.

Preferably, the hydrofluoric acid wastewater treatment method further comprises:

a neutralized liquid concentration step comprising bringing the condensed water obtained in the condensation step into contact with an alkali and/or bringing the dehydrofluorinated vapor before condensation in the condensation step into contact with an alkali to produce a neutralized liquid, followed by concentrating the neutralized liquid by evaporation to produce a concentrated neutralized liquid and a re-dehydrofluorinated vapor;

a concentrated neutralized liquid separation step comprising separating the concentrated neutralized liquid obtained in the neutralized liquid concentration step into hydrofluoric acid-containing water, alkali-containing water and desalted water using ion exchange membranes.

Preferably, the hydrofluoric acid concentration step further comprises a step of concentrating the solution of hydrofluoric acid-containing vapor obtained in the dissolution step.

Another hydrofluoric acid wastewater treatment method for achieving the object of the invention comprises the following steps;

a first concentration step comprising concentrating hydrofluoric acid wastewater by evaporation to produce a concentrated hydrofluoric acid water and a hydrofluoric acid-containing vapor;

a neutralization-condensation step comprising neutralizing and condensing the hydrofluoric acid-containing vapor obtained in the first concentration step to produce a neutralized liquid;

a second concentration step comprising concentrating the neutralized liquid obtained in the neutralization-condensation step to produce a concentrated neutralized liquid: and a separation step comprising separating the concentrated neutralized liquid obtained in the second concentration step into hydrofluoric acid-containing water, alkali-containing water and desalted water using ion exchange membranes.

The above object of the invention is achieved by a device for treating wastewater containing hydrofluoric acid, comprising:

a hydrofluoric acid concentrator for concentrating hydrofluoric acid wastewater by evaporation to produce a concentrated hydrofluoric acid water and a hydrofluoric acid-containing vapor;

a water contactor for bringing the hydrofluoric acid-containing vapor obtained by the concentrator into contact with dissolution water to dissolve the vapor;

an alkali contactor for bringing the residual hydrofluoric acid-containing vapor left from the water contactor into contact with an alkali to produce a neutralized liquid and a dehydrofluorinated vapor; and a condenser for condensing the dehydrofluorinated vapor obtained by the alkali contactor to produce condensed water.

Preferably, the hydrofluoric acid wastewater treatment device further comprises a separator for separating the neutralized liquid obtained by the alkali contactor into hydrofluoric acid-containing water, alkali-containing water and desalted water using ion exchange membranes.

Preferably, the hydrofluoric acid wastewater treatment device further comprises a neutralization-concentration apparatus for bringing the condensed water obtained by the condenser into contact with an alkali and/or bringing the dehydrofluorinated vapor before condensation in the condenser into contact with an alkali to produce a neutralized liquid, and concentrating the neutralized liquid by evaporation to produce a concentrated neutralized liquid and a re-dehydrofluorinated vapor. Preferably, the separator is configured in such a manner that both the concentrated neutralized liquid obtained by the neutralization-concentration apparatus and the neutralized liquid obtained by the alkali contactor can be separated into hydrofluoric acid-containing water, alkali-containing water and desalted water using ion exchange membranes.

Another hydrofluoric acid wastewater treatment device embodiment for achieving the object of the invention comprises:
a first concentrator for concentrating hydrofluoric acid wastewater by evaporation to produce a concentrated hydrofluoric acid water and a hydrofluoric acid-containing vapor;
a neutralizer and a condenser for neutralizing and condensing the hydrofluoric acid-containing vapor obtained by the first condenser to produce a neutralized liquid;
a second concentrator for concentrating the neutralized liquid obtained by the neutralizer and condenser to produce a concentrated neutralized liquid;
a separator for separating the concentrated neutralized liquid obtained by the second concentrator into hydrofluoric acid-containing water, alkali-containing water and desalted water using ion exchange membranes.

The present invention provides a hydrofluoric acid wastewater treatment method and device that enable efficient recovery of hydrofluoric acid from hydrofluoric acid-containing wastewater and also achieve sufficient reduction in the hydrofluoric acid concentration of the dehydrofluorinated water after treatment.

BEST MODE FOR CARRYING OUT THE PRESENT INVENTION

Embodiments of the invention will be described below with reference to the accompanying drawings.

FIRST EMBODIMENT

Figure 1:
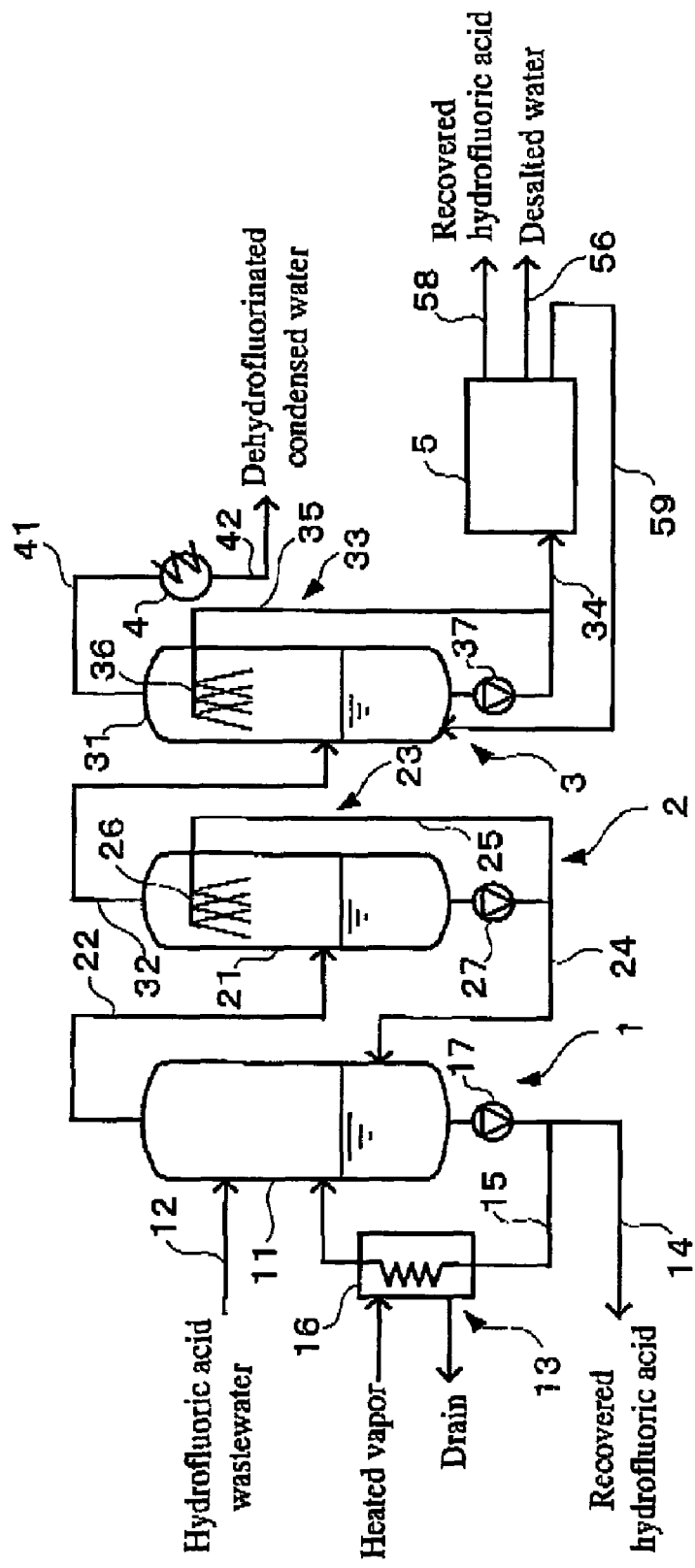
FIG. 1 is a block diagram showing the entire hydrofluoric acid wastewater treatment device according to the first embodiment of the invention.

FIG. 1 is a block diagram showing the entire hydrofluoric acid wastewater treatment device according to the first embodiment of the invention. As shown in FIG. 1, the device comprises a hydrofluoric acid concentrator 1, a water contactor 2, an alkali contactor 3, a condenser 4, and a separator 5.

The hydrofluoric acid concentrator 1 may be, for example, a flash evaporation concentrator, comprising an evaporation vessel 11 for accommodating hydrofluoric acid wastewater, a hydrofluoric acid wastewater supply line 12 for supplying hydrofluoric acid wastewater discharged from, for example, electronics components factories, to the evaporation vessel 11, a heater 13 for evaporating the hydrofluoric acid wastewater in the evaporation vessel 11 by heating, and a hydrofluoric acid recovery line 14 for discharging the hydrofluoric acid wastewater concentrated by evaporation. The heater 13 is configured in such a manner that the hydrofluoric acid wastewater in the evaporation vessel 11 passes through a heating unit 16 provided in a circulation line 15, and the hydrofluoric acid wastewater heated by the heating unit 16 is sprayed into the vessel 11 through nozzles (not shown) under reduced pressure. The hydrofluoric acid wastewater is conveyed through the hydrofluoric acid recovery line 14 or the circulation line 15 by a first pump 17. The lines are switched by manual or automatic operation of valves (not shown). Preferably, the surfaces of the evaporation vessel 11 and heater 13 in contact with hydrofluoric acid wastewater are protected by fluororesin lining, impervious graphite or the like, thereby providing sufficient corrosion resistance to concentrated hydrofluoric acid water.

The water contactor 2 may be, for example, a spray scrubber, packed tower scrubber, tray scrubber or like water purification scrubber. The water contactor 2 comprises: a flash column 21 to which dissolution water such as purified water is fed through a dissolution water supply line (not shown); a hydrofluoric acid vapor supply line 22 for supplying the hydrofluoric acid-containing vapor obtained in the evaporation vessel 11 to the flash column 21; a dissolution water sprayer 23 for spraying the dissolution water accommodated in the flash column 21; and a return line 24 for returning to the evaporation vessel 11 the hydrofluoric acid water produced by the contact of the sprayed water with the hydrofluoric acid vapor. The dissolution water sprayer 23 is configured in such a manner that the dissolution water in the flash column 21 is transported upward through a sprayer line 25 and sprayed through nozzles 26 at an end of the sprayer line 25, whereby hydrofluoric acid vapor in the flash column 21 is dissolved in the misty liquid microdrop spray to produce hydrofluoric acid water. The hydrofluoric acid water is conveyed through the return line 24 or the spraying line 25 by a second pump 27. The lines are switched by manual or automatic operation of valves (not shown).

The alkali contactor 3 may be, for example, an alkali scrubber structurally similar to a water purification scrubber. The alkali contactor 3 comprises a neutralization column 31 to which an aqueous alkaline solution such as aqueous KOH solution or aqueous NaOH solution is supplied through a neutralization water supply line (not shown); a residual hydrofluoric acid vapor supply line 32 for supplying the residual hydrofluoric acid vapor of the flash column 21 to the neutralization column 31; a neutralization water sprayer 33 for spraying an aqueous alkaline solution of the neutralization column 31; and a neutralized liquid discharge line 34 for discharging from the neutralization column 31 the neutralized liquid produced by the contact of hydrofluoric acid vapor with the aqueous alkaline solution. The neutralization water sprayer 33 is configured in such a manner that the aqueous alkaline solution In the neutralization column 31 is transported upward through the sprayer line 35 and is sprayed through nozzles 36 at an end of the sprayer line 35 to bring the hydrofluoric acid vapor of the neutralization column 31 into contact with the misty liquid microdrop spray and allowed to react to produce a neutralized salt. The aqueous alkaline solution is transported through the neutralized liquid discharge line 34 or the spray line 35 by a third pump 37. The lines are switched by manual or automatic operation of valves (not shown).

The condenser 4 is configured in such a manner that the dehydrofluorinated vapor. i.e., vapor from which hydrofluoric acid vapor has been almost completely removed in the neutralization column 31 is introduced through a dehydrofluorinated vapor supply line 41 and cooled by cooling water under reduced pressure using a vacuum pump (not shown), thus giving dehydrofluorinated condensed water. The cooling water may be, for example, industrial water cooled by a cooling tower not shown, or cold water (chiller water) cooled in a freezer (not shown). The dehydrofluorinated condensed water is discharged through a condensed water discharge line 42.

Figure 2:
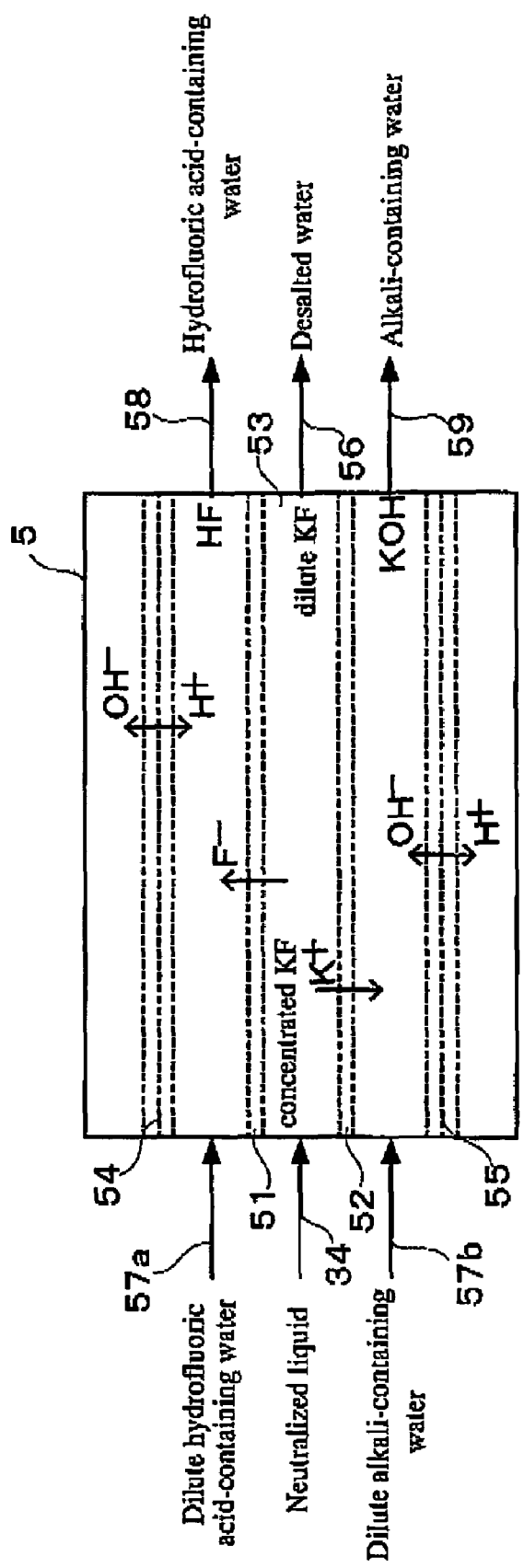
FIG. 2 is a diagram of the substantial part of the hydrofluoric acid wastewater treatment device shown in FIG. 1.

The separator 5 is a device for separating the neutralized liquid discharged from the neutralization column 31 via the neutralized liquid discharge line 34. The separator may be, for example, a bipolar membrane separator. As shown in FIG. 2, a bipolar membrane separator is an electrodialysis apparatus comprising a pair of electrodes (not shown), configured in such a manner that paired anion-exchange and cation-exchange membranes 51 and 52 form a neutralized salt chamber 53, and bipolar membranes 54 and 55 oriented parallel to the anion-exchange and cation-exchange membranes 51 and 52 are disposed on each side of the neutralized salt chamber 53 respectively. The neutralized salt chamber 53 is connected at one end to the neutralized liquid discharge line 34 of the alkali contactor 3 and at the other end to a desalted water discharge line 56 to discharge desalted water passed through the neutralized salt chamber 53. Dilute hydrofluoric acid-containing water supply line 57a and dilute alkali-containing water supply line 57b are connected between the anion exchange membrane 51 and the bipolar membrane 54 and between the cation-exchange membrane 52 and the bipolar membrane 55, respectively. Hydrofluoric acid-containing water and alkali-containing water can be discharged via hydrofluoric acid-containing water discharge line 58 and alkali-containing water discharge line 59, respectively. Although only one cell is shown in separator 5 in this embodiment, the separator usually comprises two or more cells.

An operation of the hydrofluoric acid wastewater treatment device thus configured is described below with reference to the flow chart of FIG. 3. A preferable example of targeted hydrofluoric acid wastewater is hydrofluoric acid wastewater having a dilute concentration of 0.1 to 3 wt. % (hereinafter simply referred to as "%") and discharged in semiconductor or liquid crystal manufacturing, such as water having been used in a washing step for removal of silicon oxide films in an electronic components manufacturing process. Before operating the device, predetermined amounts of hydrofluoric acid wastewater, dissolution water (purified water in this embodiment) and neutralization water (aqueous KOH solution in this embodiment) are placed in the evaporation vessel 11, flash column 21 and neutralization column 31, respectively.

First, a hydrofluoric acid concentration step (Step S1) is performed in hydrofluoric acid concentrator 1. More specifically, the pressure in the evaporation vessel 11 is adjusted so that the hydrofluoric acid wastewater is saturated at the current temperature. The hydrofluoric acid wastewater is then heated by heater 16 by the operation of first pump 17 to provide a supersaturated liquid at about 5° C. above saturation temperature. The supersaturated liquid is sprayed through nozzles (not shown), whereby the supersaturated portion of the liquid evaporates while the hydrofluoric acid wastewater accommodated in the evaporation vessel 11 is gradually concentrated. Thus concentrated hydrofluoric acid water and hydrofluoric acid-containing vapor are produced from the hydrofluoric acid wastewater.

The pressure in the evaporation vessel 11 is preferably set to, for example, about 0.0074 Mpa, i.e., the saturation pressure corresponding to a saturation temperature of approximately 40° C. In this case, when the liquid In the vessel has a concentration of about 3%, the hydrofluoric acid-containing vapor has a hydrofluoric acid concentration of about 0.2%. The hydrofluoric acid-containing vapor is supplied to flash column 21 via hydrofluoric acid vapor supply line 22.

A dissolution step (Step S2) is performed in water contactor 2. More specifically, the second pump 27 is activated to pass dissolution water through spray line 25 and the dissolution water is sprayed through nozzles 26, whereby the hydrofluoric acid-containing vapor is brought into contact with liquid drops of a dissolution water such as purified water permeated in the flash column 21. As a result, a large portion of the hydrofluoric acid contained in the vapor (about 60 to 90%, depending on the conditions such as the liquid concentration In the vessel) is dissolved in the dissolution water and removed.

The hydrofluoric acid concentration of the dissolution water stored in the flash column 21 gradually increases, resulting in a dilute concentration of hydrofluoric acid water. The hydrofluoric acid water can be supplied to the evaporation vessel 11 by the operation of switching valves (not shown) to switch from the spray line 25 to the return line 24. Purified water or dehydrofluorinated condensed water as described later can replenish the dissolution water for the flash column 21.

In this way, a remarkably enhanced recovery of hydrofluoric acid can be achieved by using the water contactor 2. Hydrofluoric acid wastewater often contains hydrofluoric acid silicates, some of which is converted to silicon fluoride and goes along with the vapor. However, most of silicon fluoride is converted to silica and captured in the flash column 21 where dilute hydrofluoric acid water is produced, thus preventing the adverse effects of silica on electrodialysis apparatus and like devices used in the subsequent steps.

A neutralization step (Step S3) is performed In alkali contactor 3. More specifically, the third pump 37 is activated to pass neutralization water through spray line 35 and the neutralization water is sprayed through nozzles 36, whereby the hydrofluoric acid-containing vapor is brought into contact with liquid drops of a neutralization water such as KOH permeated in the neutralization column 31, thus producing a neutralized salt such as potassium fluoride (KF). Consequently, the neutralized salt concentration of the neutralization water gradually increases, resulting in a neutralized liquid having a pH of about 9 to 12. The neutralized salt concentration of the neutralization water may be, for example, about 10%. The dehydrofluorinated vapor, i.e., vapor from which hydrofluoric acid Is removed by neutralization column 31, is supplied to condenser 4 via dehydrofluorinated supply line 41.

A condensation step (step S4) is performed in condenser 4. More specifically, the dehydrofluorinated vapor supplied is cooled under reduced pressure by heat exchange with cooling water to give a dehydrofluorinated condensed water. The dehydrofluorinated condensed water has a sufficiently reduced hydrofluoric acid concentration and can be discharged via condensed water discharge line 42 or can be recovered as partially purified water.

A neutralized liquid separation step (Step S5) is performed in separator 5. The neutralized liquid obtained in neutralization column 31 is supplied to separator 5. As shown in FIG. 2, the cation $K^+$ migrates through the cation exchange membrane 52 in the neutralized salt chamber 53, whereas the anion $F^-$ migrates through the anion exchange membrane 51. The dilute hydrofluoric acid-containing water and dilute alkali-containing water supplied through the dilute hydrofluoric acid-containing water supply line 57a and the dilute alkali-containing water supply line 57b are dissociated into $H^+$, $OR^-$, etc. in bipolar membranes 54, 55, and $H^+$ combines with $F^-$ to produce hydrofluoric acid-containing water containing HF, and $OH^-$ combines with $K^+$ to produce an alkali-containing water containing KOH. The hydrofluoric acid-containing water and the alkali-containing water are discharged via hydrofluoric acid-containing water discharge line 58 and alkali-containing water discharge line 59, respectively. The desalted water passed through the neutralized salt chamber. i.e., water from which a neutralized salt has been removed, is discharged through desalted water discharge line 56.

The hydrofluoric acid-containing water discharged through hydrofluoric acid-containing water discharge line 58 may have a concentration of, for example, about 4% and can be used for various applications such as acidic washing of metals. The hydrofluoric acid-containing water discharge line 58 may be connected to evaporation vessel 11 of the hydrofluoric acid concentrator 1, whereby the hydrofluoric acid-containing water obtained in separator 5 can be reconcentrated. In this process, it is also possible that part of the hydrofluoric acid-containing water discharged from hydrofluoric acid-containing water discharge line 58 is diluted with an appropriate amount of purified water to achieve a specified dilute concentration and then re-supplied through dilute hydrofluoric acid-containing water supply line 57a.

In this embodiment, the alkali-containing water discharge line 59 is connected to neutralization column 31 so as to reuse the alkali water for neutralization in the alkali contactor 3. However, it is also possible to use the alkali-containing water for other purposes without supplying the alkali-containing water to the neutralization column 31. In this process, it is also possible that part of the alkali-containing water discharged from alkali-containing water discharge line 59 is diluted with an appropriate amount of purified water to achieve a specific dilute concentration and then resupplied through dilute alkali-containing water supply line 57b.

In this embodiment, the desalted water discharge line 56 carries the desalted water for direct discard. However, it is also possible to re-introduce the desalted water into separator 5 by connecting the discharge line 56 to the neutralization column 31. Alternatively, the desalted water discharge line 56 may be connected to a neutralized liquid tank (not shown) disposed in the neutralized liquid discharge line 34, so that the water is circulated until the neutralized liquid concentration in the tank is reduced to a specific level.

The supply of hydrofluoric acid wastewater to the hydrofluoric acid condenser 1 may be stopped immediately after the activation of the first pump 17. However, in this embodiment, the supply is continued so as to compensate the amount of evaporation, so that the hydrofluoric acid wastewater in the vessel 11 is maintained at a substantially constant level. In this way, after performing a pre-concentration step in which concentration by evaporation is carried out while supplying hydrofluoric acid wastewater, the supply of hydrofluoric acid wastewater to the hydrofluoric acid concentrator 1 is stopped and then a post-concentration step is carried out while hydrofluoric acid wastewater continues to be evaporated by heater 13. By adding such a post-concentration step, the desired hydrofluoric acid wastewater concentration can be easily achieved in a short time at high hydrofluoric acid recovery rates.

Switching from the pre-concentration step to the post-concentration step, or termination of the post-concentration step can be done by allowing the reaction to proceed for a set time, or be based on monitoring the concentration (e.g., electrical conductivity measurements) of the concentrated hydrofluoric acid water passing through circulation line 15. For example, when the hydrofluoric acid wastewater treatment device is operated on a 24-hour cycle, the device can be operated for 19 hours and the rest of time can be used for the supply of liquids such as hydrofluoric acid wastewater, transfer of the concentrated hydrofluoric acid water, discharge of the remaining impurities, etc.

The above operation method describes a method effective for achieving the highest hydrofluoric acid recovery. It is also possible to use a continuous method of operation comprising continuously supplying hydrofluoric acid wastewater while the concentrations of hydrofluoric acid in the evaporation vessel 11 and the flash column 21 are maintained at preset levels, and returning the hydrofluoric acid water to the evaporation vessel 11 while the concentrated hydrofluoric acid water is drawn from the evaporation vessel 11 and dissolution water is added to the flash column 21.

The concentration of concentrated hydrofluoric acid water after the post-concentration step may be, for example, about 10 to 14%. The concentrated hydrofluoric acid water can be recovered by operating switching valves (now shown) to switch from the circulation line 15 to the hydrofluoric acid recovery line 14 and used as a high concentration hydrofluoric acid water for various industrial purposes (e.g., washing of semiconductors or like electronics components in purification processes, acidic washing of metals, etc.).

As shown above, according to the hydrofluoric acid wastewater treatment device of the first embodiment, the hydrofluoric acid vapor obtained by the hydrofluoric acid concentrator 1 is brought into contact with dissolution water by water contactor 2 to dissolve therein and be recovered, thus achieving-a high hydrofluoric acid recovery rate. Furthermore, hydrofluoric acid vapor left from water contactor 2 is-removed by neutralization by alkali contactor 3, thus achieving sufficient reduction in the hydrofluoric acid concentration of the condensed water obtained by condenser 4.

Moreover, the neutralized liquid is separated into hydrofluoric acid-containing water, alkali-containing water and desalted water in separator 5, thus achieving an enhanced hydrofluoric acid recovery. In addition, since it is unnecessary to use slaked lime, etc. in the neutralized liquid treatment, waste generation is avoided.

An example of a hydrofluoric acid wastewater treatment according to this embodiment is shown below. When 1% hydrofluoric acid wastewater was supplied to the hydrofluoric acid concentrator 1 at a rate of 10000 kg/day, concentrated (14%) hydrofluoric acid water was recovered from the hydrofluoric acid concentrator 1 at a rate of 630 kg/day. 12,300 kg/day of condensed water was discharged from condenser 4 and had a KF concentration of approximately 0.005%, 3.85% hydrofluoric acid-containing water and 11% alkali-containing water were recovered from separator 5 at a rate of 270 kg/day and 280 kg/day respectively.

SECOND EMBODIMENT

Figure 4:
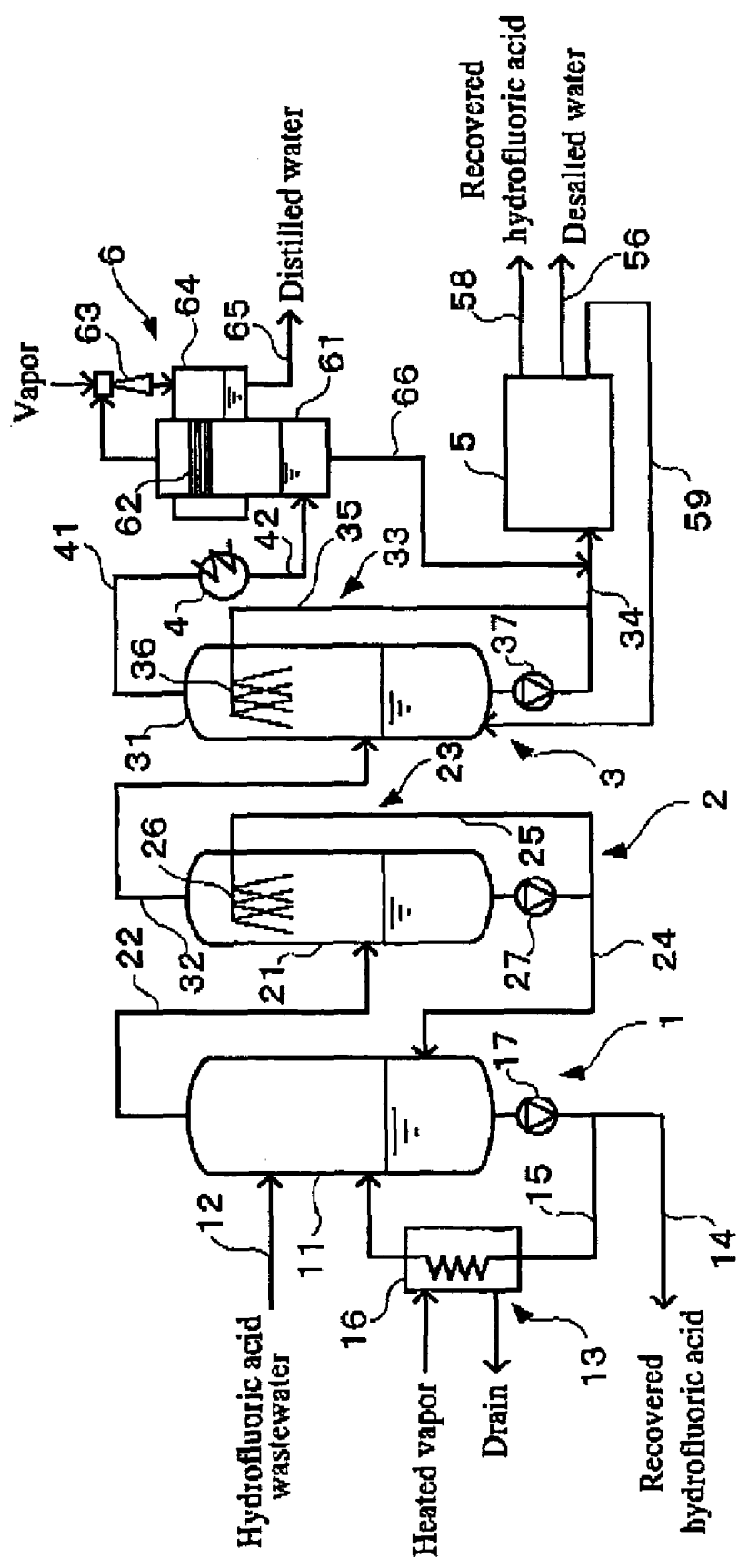
FIG. 4 is a block diagram showing the entire hydrofluoric acid wastewater treatment device accord hg to the second embodiment of the invention.

FIG. 4 is a block diagram showing the entire hydrofluoric acid wastewater treatment device according to the second embodiment of the invention. This device is structurally the same as in FIG. 1 except that it further comprises a neutralization-concentration apparatus 6 for neutralizing and concentrating the dehydrofluorinated condensed water obtained by condenser 4. Therefore, the same numerical codes as in FIG. 1 are used to refer to the same component parts and detailed description thereof is omitted here.

The neutralization-concentration apparatus 6 may be, for example, a reduced-pressure horizontal tube single-effect steam heating device. The device comprises an evaporation vessel 61 to which an aqueous alkaline solution (e.g., aqueous KOH solution or aqueous NaOH solution) as neutralization water is supplied through a neutralization water supply line (not shown). Condensed water discharge line 42 is connected to evaporation vessel 61 to supply dehydrofluorinated condensed water from condenser 4. The evaporation vessel 61 comprises a heating tube 62, an ejector 63, and a distilled water bath 64. The dehydrofluorinated condensed water supplied to the evaporation vessel 61 is sprayed over heating tube 62 by the activation of a circulation pump not shown, and evaporates from the surface of heating tube 62. The vapor thus generated is sucked into the ejector 63 and passes, together with the driving vapor (e.g., water vapor) of ejector 63, through the inside of the heating tube 62, thus evaporating the water sprayed an the surface of the heating tube 62, while the vapor is condensed into distilled water and introduced into distilled water bath 64.

The distilled water collected in the distilled water bath 64 is discharged through a distilled water discharge line 65. The concentrated neutralized liquid concentrated by evaporation in the evaporation vessel 61 joins the neutralized liquid discharged by the neutralized liquid discharge line 34 via a concentrated liquid supply line 66, collected in a neutralized liquid tank (now shown) and then supplied to a separator 5.

Since the vapor generated in the evaporation vessel 61 has a sufficiently reduced hydrofluoric acid concentration unlikely to cause corrosion, the heating tube 62 can be made of stainless steel, etc. and there is no need for protection by fluororesin lining or impervious graphite. Other evaporation concentrators such as multiple effect type or vapor compression type concentrators can also be used as the neutralization-concentration apparatus 6.

Figure 5:
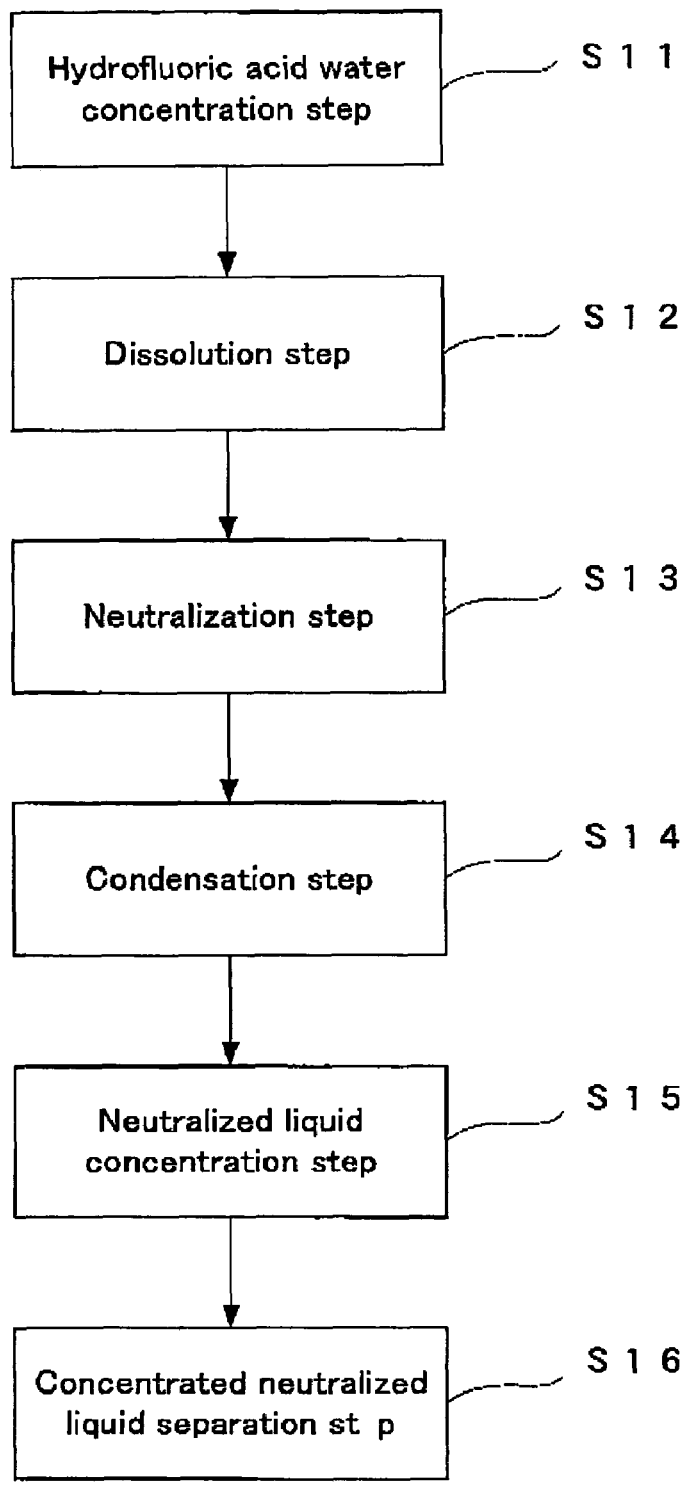
FIG. 5 is a flow chart showing the operation of the hydrofluoric acid wastewater treatment device shown in FIG. 4.

According to the hydrofluoric acid wastewater treatment device thus configured, treatment is performed by the steps shown in the flow chart (FIG. 5). While steps S11 to S14. i.e., the hydrofluoric acid concentration step, dissolution step, neutralization step, and condensation step are the same as steps S1 to S4 in the first embodiment, the process according to the second embodiment further comprises a neutralized liquid concentration step (Step S15) and a concentrated neutralized liquid separation step (Step S16) after the condensation step (Step S14).

The dehydrofluorinated vapor condensed in the condensation step (step S14) has a sufficiently reduced hydrofluoric acid concentration although hydrofluoric acid may not be completely removed. In the neutralized liquid condensation step (step S15), a set amount of aqueous alkaline solution is stored as neutralization water in the evaporation vessel 61 of neutralization-concentration apparatus 6, and the dehydrofluorinated condensed water supplied to evaporation vessel 61 through the condensed water discharge line 42 of condenser 4 is mixed with the aqueous alkaline solution, whereby hydrofluoric acid contained in the dehydrofluorinated condensed water, if any, is neutralized into a neutralized salt. The aqueous alkaline solution supplied to the evaporation vessel 61 should have a low concentration suitable to the hydrofluoric acid concentration of the dehydrofluorinated condensed water and may be, for example, about 0.1%.

The neutralized liquid thus obtained is heated by heating tube 62 and concentrated by evaporation into a concentrated neutralized liquid. The KF concentration of the concentrated neutralized liquid is, for example, about 10 to 15% (about 100 to 150-fold concentration) and sufficiently lower than the saturation solubility (about 30%).

On the other hand, the vapor generated by heating in evaporation vessel 61 is a re-dehydrofluorinated vapor, i.e., dehydrofluorinated vapor of the condensation step from which hydrofluoric acid has been removed again. The re-dehydrofluorinated vapor is sucked by the reduced pressure created by the air stream of driving vapor in ejector 63, is condensed into water and is collected in distilled water tank 64. The condensed water discharged through distilled water discharge line 65 has a further reduced hydrofluoric acid concentration, compared to the dehydrofluorinated condensed water discharged from condenser 4, and can be used as purified water or dissolution water in water contactor 2.

In the concentrated neutralized liquid separation step (step S16), the concentrated neutralized liquid obtained in the neutralized liquid concentration step is supplied to separator 5 and separated into hydrofluoric acid-containing water, alkali-containing water and desalted water in a similar manner as in neutralized liquid separation step S5 of the first embodiment.

In the second embodiment, the neutralized liquid obtained by the alkali contactor 3 and the concentrated neutralized liquid obtained by the neutralization-concentration apparatus 6 are collected in a neutralized liquid tank (not shown) and then supplied to separator 5, whereby a neutralized liquid separation step as in step S5 and a concentrated neutralized liquid separation step as in step S15 are carried out concurrently. The neutralized liquid and the concentrated neutralized liquid may be supplied to separator 5 through individual lines, and the neutralized liquid separation step and the concentrated neutralized liquid separation step may be carried out separately.

In this embodiment, neutralization-concentration apparatus 6 is disposed downstream of condenser 4 and condensed water produced in condenser 4 is brought into contact with an alkali to produce a neutralized liquid. However, it is also possible for the neutralization-concentration apparatus to be configured in such a manner that an about 10% alkali solution can be sprayed on the dehydrofluorinated vapor passing through the dehydrofluorinated vapor supply line 41 and the vapor be condensed by condenser 4 after neutralization and the resulting neutralized liquid be concentrated by evaporation. The neutralized liquid can also be produced by contacting an alkali with both the dehydrofluorinated vapor before being supplied to condenser 4 and the condensed liquid obtained by condenser 4.

As shown above, according to the hydrofluoric acid wastewater treatment device of the second embodiment, the dehydrofluorinated condensed water obtained in the condensation step, which contains a trace amount of hydrofluoric acid, is neutralized and concentrated and the resulting concentrated neutralized liquid is separated into hydrofluoric acid-containing water, alkali-containing water and desalted water, thus achieving a further enhancement of hydrofluoric acid recovery.

The condensed water obtained by the condensation of the re-dehydrofluorinated vapor generated in the neutralization and concentration has a further reduced hydrofluoric acid concentration compared to the dehydrofluorinated condensed water obtained in the condensation step.

THE THIRD EMBODIMENT

Figure 6:
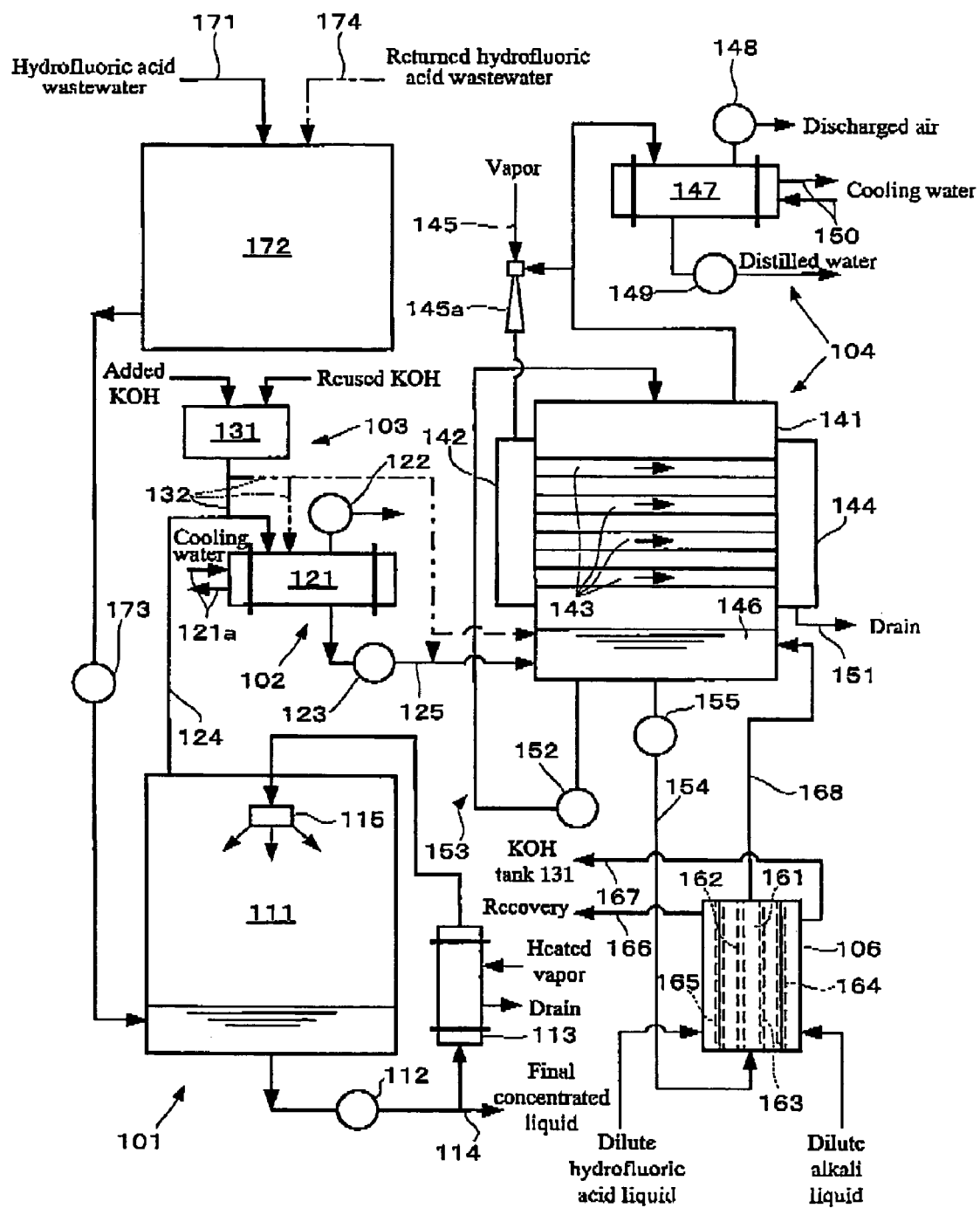
FIG. 6 is a block diagram showing the entire hydrofluoric acid wastewater treatment device according to the third embodiment of the invention.

FIG. 6 is a block diagram showing the entire hydrofluoric acid wastewater treatment device according to the third embodiment of the invention. This hydrofluoric acid wastewater treatment device is a device for treating hydrofluoric acid wastewater containing a dilute concentration of hydrofluoric acid, comprising a first concentrator 101, condenser 102, neutralizer 103, second concentrator 104, and separator 106.

Hydrofluoric acid wastewater is supplied to the first concentrator 101 from a hydrofluoric acid wastewater supply device 107. In this embodiment, the hydrofluoric acid wastewater supply device 107 comprises a hydrofluoric acid wastewater supply system 171 leading from an electronics components factory etc., an undiluted-wastewater tank 172, and an undiluted wastewater pump 173.

In the first concentrator 101, the hydrofluoric acid wastewater is concentrated by evaporation and separated into a desired concentration (e.g., 10%) of concentrated hydrofluoric acid liquid and a hydrofluoric acid-containing vapor (e.g., about 0.7% concentration). The first concentrator 101 is a flash evaporation concentrator, comprising a vessel body 111 for storing liquid hydrofluoric acid wastewater, a circulation pump 112 and a heater 113 provided in a heating circulation system for drawing liquid from vessel body 111 and returning the liquid to the vessel body 111, a recycled hydrofluoric acid water system 114 for providing a final concentrated hydrofluoric acid liquid. The circulation liquid in the circulation heating system is sprayed through spray nozzles 115. The inner surface of the vessel body 111 is preferably protected by fluororesin lining, impervious graphite, etc., whereby corrosion due to the hydrofluoric acid wastewater can be prevented.

Condenser 102 is a device for receiving and condensing the hydrofluoric acid vapor evaporated from the first concentrator 101 and pumping condensate out. The condenser comprises a condensation vessel 121 for receiving and condensing the vapor under reduced pressure, a vacuum pump 122 for reducing the pressure in condensation vessel 121, and a condensate pump 123 for pumping the condensate out. A cooling water pipe 121a is provided to pass through condensation vessel 121. The cooling water may be, for example, industrial water cooled in a freezer (not shown) or cold water (chiller water).

Neutralizer 103 Is a device for producing a highly water-soluble salt by reacting hydrofluoric acid-containing vapor with an alkali (e.g., potassium hydroxide (KOH), sodium hydroxide (NaOH) and the like). In this embodiment, KOH is added to the hydrofluoric acid-containing vapor to produce a neutralized solution of aqueous potassium fluoride (hereinafter referred to as "KF liquid"). Neutralizer 103 comprises an alkali tank 131 and a supply line system 132.

In this embodiment, the supply line system 132 is connected to a vapor pipe 124 for supplying hydrofluoric acid-containing vapor from the condenser 102 to the first concentrator 101. As shown by chain double-dashed lines in FIG. 6, the supply line system may be connected to the body of condensation vessel 121, condensed water outlet tube 125, or the body 141 of second concentrator 104 described below.

Second concentrator 104 is a device for producing a concentrated neutralized liquid (concentrated KF liquid) by concentrating the neutralized liquid (KF liquid) by evaporation. The concentrator comprises a body 141, a heated vapor chamber 142, heating tubes 143, a condensed water chamber 144, a heated vapor system 145 comprising an ejector 145a, a reservoir 146 for storing concentrate, a condenser 147, a vacuum pump 148, a distilled water pump 149, a cooling water system 150, a heated vapor drain system 151, a concentrate circulation system 153 comprising a concentrate circulation pump 152, a concentrate transfer system 154, and a concentrate transfer pump 155.

Since the hydrofluoric acid-containing vapor in the second concentrator 104 has a sufficiently reduced concentration compared to the vapor in the first concentrator 101 that corrosion by hydrofluoric acid is unlikely to occur, heating tube 143 can be made of, for example, stainless steel. The second concentrator 104 may be a highly efficient evaporation concentrator such as a multiple effect type or vapor compression type evaporation concentrator.

Separator 106 is a device for separating the concentrated KF liquid Into hydrofluoric acid-containing water, alkali-containing water and desalted water by ion exchange. The separator is a three-chamber bipolar membrane separator comprising paired anion-exchange and cation-exchange membranes 162 and 163 forming a neutralized salt chamber 161 through which the concentrated KF liquid passes and further comprising a cationic bipolar membrane 164 and an anionic bipolar membrane 165 positioned parallel to membranes 162 and 163, and disposed on each side of the neutralized salt chamber 161, respectively.

Separator 106 is connected to recovery systems 166 and 167 for recovering the hydrofluoric acid-containing water and alkali-containing water as recovered hydrofluoric acid and neutralization alkali (KOH), respectively. The recovered hydrofluoric acid is of a high concentration but is of a small amount and recovery system 166 suitably extends to the location where it is used. As shown by a chain double-dashed line in FIG. 6, the configuration may be arranged, for example, so that the recovered hydrofluoric acid returns to undiluted wastewater tank 172 through a hydrofluoric acid return system 174 to be reprocessed. With such a configuration, even when there is no special usage for the recovered hydrofluoric acid water, hydrofluoric acid water can be treated without being discharged as waste.

Recovery system 167 is connected to a KOH tank 131 and the alkali for neutralization is reused. A desalted water outlet system 168 for drawing diluted desalted water is connected to the body 141 of the second concentrator 104, so that desalted water can be concentrated again by evaporation. The oxygen and hydrogen generated in separator 106 are released directly or through lines into the atmosphere.

Although only one cell is shown in separator 106 in FIG. 6, the separator usually comprises two or more cells.

In the hydrofluoric acid wastewater treatment device, facilities such as electrical systems, manual valves, automatic valves and like accessories and operational devices are optionally added. The device is configured in such a manner that it can be operated automatically, manually, etc. according to the purpose of use.

Figure 7:
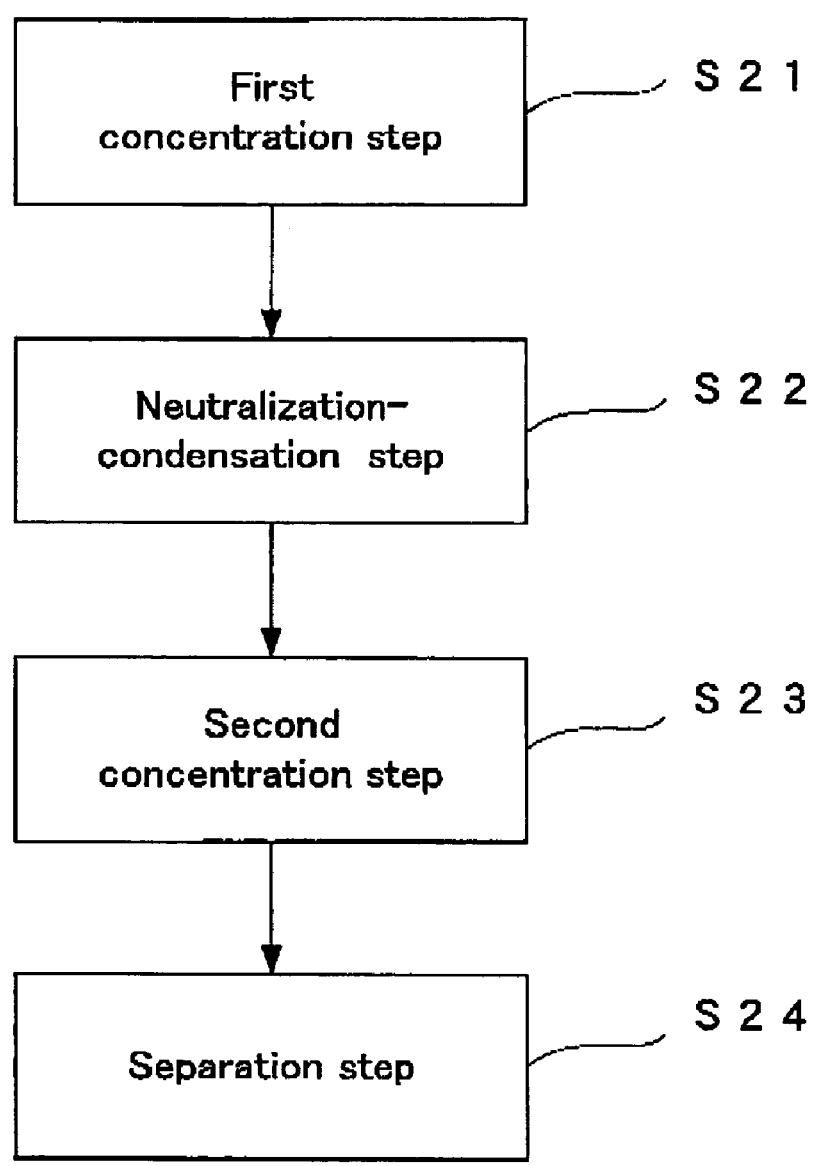
FIG. 7 is a flow chart showing the operation of the hydrofluoric acid wastewater treatment device shown in FIG. 6.

An operation of the thus configured hydrofluoric acid wastewater treatment device is described below with reference to the flow chart of FIG. 7. The hydrofluoric acid wastewater treatment method according to the third embodiment comprises a first concentration step (Step S21), a neutralization-condensation step (Step S22), a second concentration step (Step S23), and a separation step (Step S24).

In the first concentration step (Step S21), hydrofluoric acid wastewater is concentrated by evaporation and separated into a desired concentration (e.g., 10) of concentrated hydrofluoric acid water and an approximately 0.3% hydrofluoric acid-containing vapor, The undiluted hydrofluoric acid wastewater supplied via the hydrofluoric wastewater supply system 171 has a low concentration, e.g., about 0.5 to about 1%.

The undiluted wastewater is supplied to vessel 111 of the first concentrator 101 by diluted liquid pump 173. More specifically, a certain amount of undiluted wastewater Is placed in vessel 111 and the supply of the wastewater is continued to compensate the amount of evaporation in the vessel 111.

In this embodiment, the first concentration step comprises two concentration steps, i.e. a pre-concentration step comprising concentration by evaporation while supplying the undiluted wastewater and a post-concentration step comprising concentration by evaporation after stopping the supply of the undiluted wastewater. The former Is the main step and the latter is an additional step. The pre-concentration step and post-concentration step can be controlled, for example, based on monitoring the concentration of concentrate in vessel 111. The concentration can be detected, for example, by measuring electrical conductivity of the circulated concentrate. By adding such a post-concentration step, the desired concentration of concentrate can be easily achieved in a short time with a high degree of hydrofluoric acid recovery.

When the first concentrator 101 is a flash concentrator, the pressure in the vessel 111 is adjusted so that the undiluted wastewater is saturated at the current temperature. The undiluted wastewater is heated by a heater 113 with the operation of circulation pump 112 to provide a supersaturated liquid at about 5° C. above saturation temperature. The supersaturated liquid is sprayed through spray nozzles 115, whereby the supersaturated portion of the liquid is separated in the form of water vapor from the undiluted wastewater. The pressure in the evaporation vessel 111 is preferably set to, for example, about 0.0074 Mpa, which is the saturation pressure corresponding to a saturation temperature of approximately 40° C. In this case, when the liquid In the vessel has a concentration of about 3%, the vapor of hydrofluoric acid wastewater has a hydrofluoric acid concentration of about 0.2%.

In the neutralization-condensation step (Step S22), the hydrofluoric acid-containing vapor evaporated in the first concentration step (Step S21) is neutralized and condensed. More specifically, a vacuum pump 122 is operated, while cooling water is circulated through condenser 121. A slightly higher degree of vacuum is provided in condenser 121 than in vessel 111, so that vapor flows from the vessel to the condenser. An alkali such as KOH stored in alkali tank 131 is added to the hydrofluoric acid-containing vapor via supply line 132 and the vapor is condensed in condenser 121 to produce a neutralized liquid, i.e., a solution of a neutralized salt of potassium fluoride (KF). The neutralized liquid has a concentration of, for example about 0.3% and a pH of about 10.

The neutralized liquid thus obtained is pumped out by condensate pump 123 and the residual air is discharged by vacuum pump 122. When the pressure in condenser 121 is higher than that in the body 141 of the second concentrator 104, condensation pump 123 can be omitted. Solution tank 131 is the tank to which KOH recovered in the separator 106 and KOH added to make up the shortfall are supplied.

In this embodiment, a neutralized liquid is produced by condensation after addition of an alkali to the hydrofluoric acid-containing vapor. It is also possible to add an alkali during or after condensation of the hydrofluoric acid-containing vapor by changing the positions of alkali supplied by the supply line system 132 to the positions shown with a chain double-dashed line in FIG. 6. The added alkali can be reacted with the hydrofluoric acid-containing vapor in the form of an aqueous solution or vapor.

In the second concentration step (Step S23), the neutralized liquid is concentrated in a second concentrator 104 to produce a concentrated KF liquid, i.e., a concentrated neutralized liquid. For example, when the neutralized liquid obtained in the neutralization step has a concentration of about 0.3%, the liquid is concentrated 30- to 50-fold to have a high concentration of about 10% to 15%. This concentration is sufficiently low compared to the saturation solubility (about 30%). In the concentration step, the KF concentration before concentration is sufficiently low and substantially no vaporizable hydrofluoric acid exists, so that problems such as corrosion due to hydrofluoric acid do not arise. The concentrated liquid pooled in the concentrated liquid reservoir 146 is discharged little by little at specific time intervals, thereby preventing impurities from residing for more than a certain length of time. The vapor generated during the production of concentrated KF liquid is condensed by condenser 147 into high purity distilled water, which can be reused as purified water.

Figure 3:
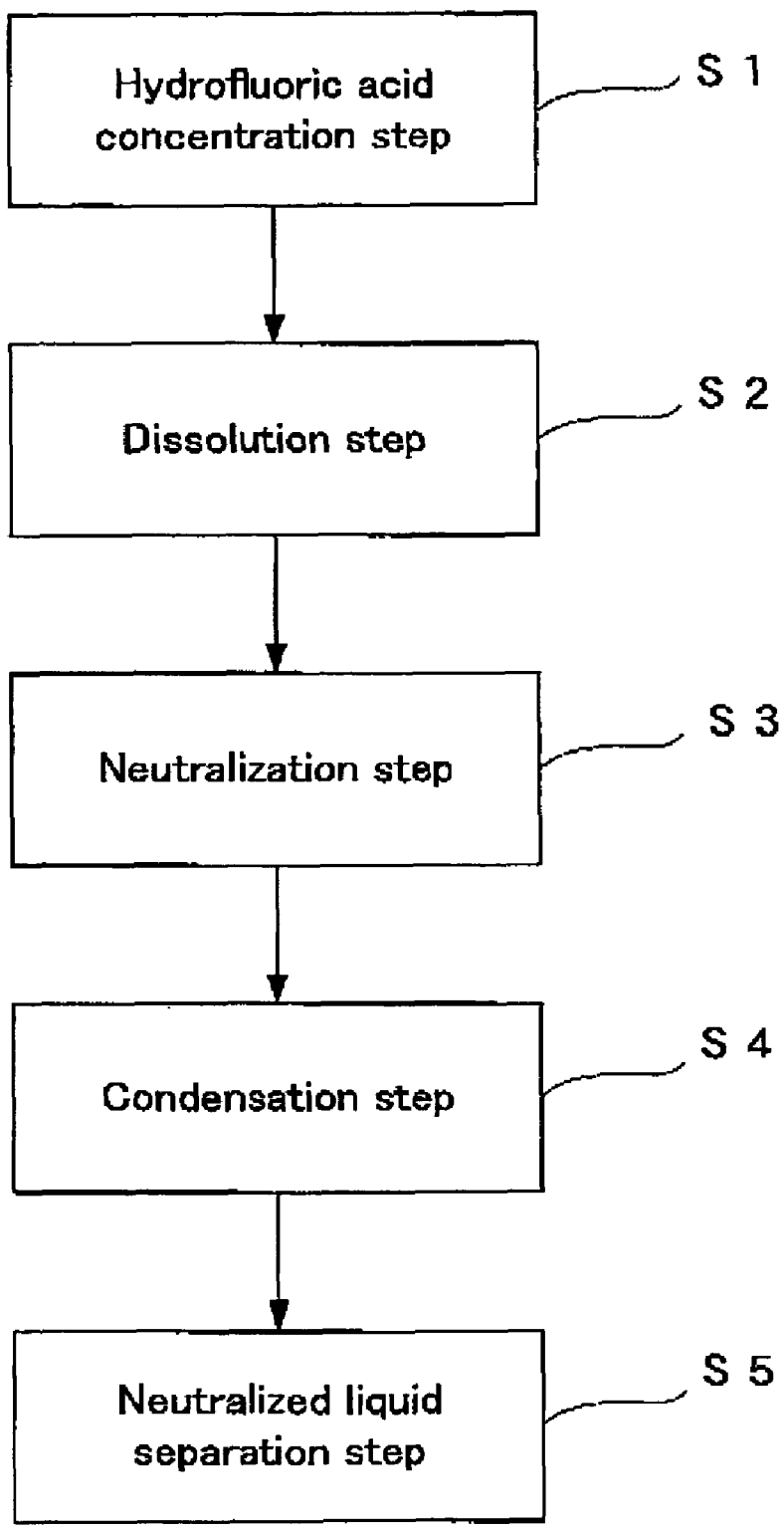
FIG. 3 is a flow chart showing the operation of the hydrofluoric acid wastewater treatment device shown in FIG. 1.

In the separation step (Step S24), while purified water is supplied to the bipolar membranes 164, 165 in separator 106, concentrated KF liquid is supplied to pass through the neutralized salt chamber 161, so that the liquid is separated into hydrofluoric acid-containing water, alkali-containing water and desalted water by ion exchange (see FIG. 3). The generated hydrofluoric acid-containing water and alkali-containing water contain hydrofluoric acid (HF) and alkali (KOH) at high concentrations and can be reused. The desalted water (diluted KF liquid) is fed back into the second concentration step (Step S23) so that it can be concentrated again by evaporation. Thus hydrofluoric acid wastewater can be treated with substantially no waste being generated.

As shown above, the hydrofluoric acid wastewater treatment device of the third embodiment achieves a high degree of hydrofluoric acid recovery because hydrofluoric acid vapor obtained in the first concentrator 101 is neutralized and concentrated in neutralizer 103 and condenser 102 and the resulting neutralized liquid is concentrated in the second concentrator 104 to produce a concentrated neutralized liquid, followed by recovery of hydrofluoric acid in separator 106. In addition, the water condensed from the vapor generated in the second concentrator 104 has a sufficiently reduced hydrofluoric acid concentration.

The present inventors conducted wastewater treatment using the hydrofluoric acid wastewater treatment device according to the third embodiment under the following conditions. The hydrofluoric acid wastewater treatment device was operated in a 24-hour cycle. The device was activated for 19 hours and the rest of time was used for the supply of liquids such as hydrofluoric acid wastewater, transfer of concentrated hydrofluoric acid water, expelling of the remaining impurities, etc. Treating 10000 kg/day of hydrofluoric acid wastewater (concentration: 1%) resulted in 630 kg/day of 14% concentrated hydrofluoric acid water, which is a good hydrofluoric acid recovery rate. The condensed water discharged in the second concentrator had a hydrofluoric acid concentration of 0.3 ppm, which is a sufficiently low level.

EXAMPLE

| | |
|---|---|
| Amount of undiluted hydrofluoric acid wastewater treated: | 10000 kg/day |
| Concentration of undiluted hydrofluoric acid wastewater (undiluted liquid): | 1% |
| The first concentration step | |
| Amount of undiluted wastewater initially supplied: | 2400 kg |
| Amount supplied (concentrated) during continuous supply of undiluted wastewater: | 650 kg/h |
| Continuous supply time: | 16.3 h |
| Concentration time after halting continuous supply: | 2.7 h |
| Saturation temperature in the vessel: | 50 °C (pressure: 0.012 MPa) |
| Circulated liquid heating temperature (heater outlet): | 55 °C |
| Circulated liquid amount: | 75 m$^3$/h |
| Hydrofluoric acid concentration (after continuous supply): | 4.2% |
| Hydrofluoric acid concentration after final concentration: | 14% |
| Amount of hydrofluoric acid water after final concentration: | 630 kg/day |
| Neutralization-condensation step | |
| Amount of condensate generated: | 12300 kg/day (19 h) |
| Hydrofluoric acid concentration of condensate generated: | 0.1% |
| Total amount of KOH supplied: | 40 kg/day |
| Of which amount replenished: | 10 kg/day |
| Amount of neutralized liquid (dilute KF): | 350 kg/day |
| KF liquid concentration: | 12% |
| Second concentration step | |
| Amount of neutralized liquid continuously supplied: | 12300 kg/day |
| Evaporation temperature in the vessel: | 70 °C (pressure: 0.031 MPa) |
| Amount of concentrated neutralized liquid (concentrated KF liquid) discharged: | 5 kg/h |
| Concentrated KF liquid concentration: | 10.4% |
| HF concentration of condensed water: | 0.3 ppm |
| Separation step | |
| Amount of separated HF (recovered hydrofluoric acid water) supplied: | 50 kg/h |
| Concentration of recovered hydrofluoric acid water: | 3.85% |
| Amount of separated KOH: | 50 kg/h (450 kg/day) |
| Concentration of separated KOH: | 11% |

The invention claimed is:

1. A hydrofluoric acid wastewater treatment method, comprising the following steps:
   a hydrofluoric acid concentration step comprising concentrating hydrofluoric acid wastewater by evaporation to produce a concentrated hydrofluoric acid water and a hydrofluoric acid-containing vapor;
   a dissolution step comprising bringing the hydrofluoric acid-containing vapor obtained in the hydrofluoric acid concentration step into contact with dissolution water to dissolve the vapor;
   a neutralization step comprising bringing the residual hydrofluoric acid-containing vapor which has not been dissolved in the dissolution water and remains undissolved in the dissolution step into contact with an alkali to produce a neutralized liquid and a dehydrofluorinated vapor; and
   a condensation step comprising condensing the dehydrofluorinated vapor obtained in the neutralization step to produce condensed water.

2. A method according to claim 1 further comprising a neutralized liquid separation step comprising separating the neutralized liquid obtained in the neutralization step into hydrofluoric acid-containing water, alkali-containing water and desalted water using ion exchange membranes.

3. A method according to claim 1 further comprising:
   a neutralized liquid concentration step comprising bringing the condensed water obtained in the condensation step into contact with an alkali and/or bringing the dehydrofluorinated vapor before condensation in the condensation step into contact with an alkali to produce a neutralized liquid, followed by concentrating the neutralized liquid by evaporation to produce a concentrated neutralized liquid and a re-dehydrofluorinated vapor; and
   a concentrated neutralized liquid separation step comprising separating the concentrated neutralized liquid obtained in the neutralized liquid concentration step into hydrofluoric acid-containing water, alkali-containing water and desalted water using ion exchange membranes.

4. A method according to claim 1, wherein the hydrofluoric acid concentration step further comprises concentrating by evaporation the hydrofluoric acid-containing vapor solution obtained in the dissolution step.

5. A hydrofluoric acid wastewater treatment method comprising the following steps:
   a first concentration step comprising concentrating hydrofluoric acid wastewater by evaporation to produce a concentrated hydrofluoric acid water and a hydrofluoric acid-containing vapor;
   a neutralization-condensation step comprising neutralizing with an alkali and condensing the hydrofluoric acid-containing vapor obtained in the first concentration step to produce a neutralized liquid;
   a second concentration step comprising concentrating the neutralized liquid obtained in the neutralization-condensation step to produce a concentrated neutralized liquid; and
   a separation step comprising separating the concentrated neutralized liquid obtained in the second concentration step into hydrofluoric acid-containing water, alkali-containing water and desalted water using ion exchange membranes.

6. A hydrofluoric acid wastewater treatment device for treating wastewater containing hydrofluoric acid, comprising:

a hydrofluoric acid concentrator for concentrating hydrofluoric acid wastewater by evaporation to produce a concentrated hydrofluoric acid water and a hydrofluoric acid-containing vapor, the hydrofluoric acid concentrator comprising a heating unit for heating hydrofluoric acid wastewater and nozzles that spray the heated hydrofluoric acid wastewater under reduced pressure, and the hydrofluoric acid concentrator having corrosion resistance to concentrated hydrofluoric acid water;

a water contactor for bringing the hydrofluoric acid-containing vapor obtained by the concentrator into contact with dissolution water to dissolve the vapor;

a first hydrofluoric acid vapor supply line for supplying the hydrofluoric acid-containing vapor from the hydrofluoric acid concentrator to the water contactor;

an alkali contactor for bringing the hydrofluoric acid-containing vapor into contact with an alkali to produce a neutralized liquid and a dehydrofluorinated vapor;

a second hydrofluoric acid vapor supply line for supplying residual hydrofluoric acid-containing vapor which has not been dissolved in the dissolution water and remains undissolved in the water contactor from the water contactor to the alkali contactor; and a condenser for condensing the dehydrofluorinated vapor obtained by the alkali contactor to produce condensed water.

7. A hydrofluoric acid wastewater treatment device for treating wastewater containing hydrofluoric acid, comprising:

a hydrofluoric acid concentrator for concentrating hydrofluoric acid wastewater by evaporation to produce a concentrated hydrofluoric acid water and a hydrofluoric acid-containing vapor;

a water contactor for bringing the hydrofluoric acid-containing vapor obtained by the concentrator into contact with dissolution water to dissolve the vapor;

a hydrofluoric acid vapor supply line for supplying the hydrofluoric acid-containing vapor from the hydrofluoric acid concentrator to the water contactor;

an alkali contactor for bringing the residual hydrofluoric acid-containing vapor which has not been dissolved in the dissolution water and remains undissolved in the water contactor into contact with an alkali to produce a neutralized liquid and a dehydrofluorinated vapor;

a condenser for condensing the dehydrofluorinated vapor obtained by the alkali contactor to produce condensed water; and a separator for separating the neutralized liquid obtained by the alkali contactor into hydrofluoric acid-containing water, alkali-containing water and desalted water using ion exchange membranes.

8. A hydrofluoric acid wastewater treatment device according to claim 7 further comprising a neutralization-concentration apparatus for bringing the condensed water obtained by the condenser into contact with an alkali and/or bringing the dehydrofluorinated vapor before condensation in the condenser into contact with an alkali to produce a neutralized liquid, and concentrating the neutralized liquid by evaporation to produce a concentrated neutralized liquid and a re-dehydrofluorinated vapor;

the separator being configured to separate the concentrated neutralized liquid obtained by the neutralization-concentration apparatus and the neutralized liquid obtained by the alkali contactor together into hydrofluoric acid-containing water, alkali-containing water and desalted water using ion exchange membranes.

9. A hydrofluoric acid wastewater treatment device for treating wastewater containing hydrofluoric acid, comprising:

a first concentrator for concentrating hydrofluoric acid wastewater by evaporation to produce a concentrated hydrofluoric acid water and a hydrofluoric acid-containing vapor;

a condenser for condensing the hydrofluoric acid-containing vapor obtained by the first concentrator to produce a condensate;

a neutralizer for neutralizing with an alkalai the hydrofluoric acid-containing vapor or the condensate to produce a neutralized liquid;

a second concentrator for concentrating the neutralized liquid to produce a concentrated neutralized liquid;

a separator for separating the concentrated neutralized liquid obtained by the second concentrator into hydrofluoric acid-containing water, alkali-containing water and desalted water using ion exchange membranes;

a vapor supply line for supplying the hydrofluoric acid-containing vapor from the first concentrator to the condenser;

a condensate outlet line for supplying the condensate from the condenser to the second concentrator; and an alkali supply line for supplying alkali from the neutralizer to at least one of the vapor supply line, condenser, condensed water outlet line, and second concentrator.

10. A hydrofluoric acid wastewater treatment device for treating wastewater containing hydrofluoric acid, comprising:

a hydrofluoric acid concentrator for concentrating hydrofluoric acid wastewater by evaporation to produce a concentrated hydrofluoric acid water and a hydrofluoric acid-containing vapor, the hydrofluoric acid concentrator comprising a heating unit for heating hydrofluoric acid wastewater and nozzles that spray the heated hydrofluoric acid wastewater under reduced pressure, and the hydrofluoric acid concentrator having corrosion resistance to concentrated hydrofluoric acid water;

a water contactor configured to receive the hydrofluoric acid-containing vapor from the concentrator and bring the hydrofluoric acid-containing vapor into contact with dissolution water to dissolve the vapor;

an alkali contactor configured to receive residual hydrofluoric acid-containing vapor from the water contactor and bring the received vapor into contact with an alkali to produce a neutralized liquid and a dehydrofluorinated vapor, the residual hydrofluoric acid-containing vapor having not been dissolved in the dissolution water and remaining undissolved in the water contactor; and a condenser for condensing the dehydrofluorinated vapor obtained by the alkali contactor to produce condensed water.

11. A hydrofluoric acid wastewater treatment device for treating wastewater containing hydrofluoric acid, comprising:

a hydrofluoric acid concentrator for concentrating hydrofluoric acid wastewater by evaporation to produce a concentrated hydrofluoric acid water and a hydrofluoric acid-containing vapor;

a water contactor for bringing the hydrofluoric acid-containing vapor obtained by the concentrator into contact with dissolution water to dissolve the vapor;

a hydrofluoric acid vapor supply line for supplying the hydrofluoric acid-containing vapor from the hydrofluoric acid concentrator to the water contactor;

an alkali contactor for bringing the residual hydrofluoric acid-containing vapor which has not been dissolved in the dissolution water and remains undissolved in the water contactor into contact with an alkali to produce a neutralized liquid and a dehydrofluorinated vapor;

a condenser for condensing the dehydrofluorinated vapor obtained by the alkali contactor to produce condensed water; and a return line for supplying the hydrofluoric acid-containing vapor solution from the water contactor to the hydrofluoric acid concentrator.

* * * * *